June 23, 1925.

C. E. H. LLOYD

MACHINE TOOL

Filed Sept. 23, 1922   2 Sheets-Sheet 1

Inventor
Charles E. H. Lloyd.
by
Edmund A. Strause
Atty.

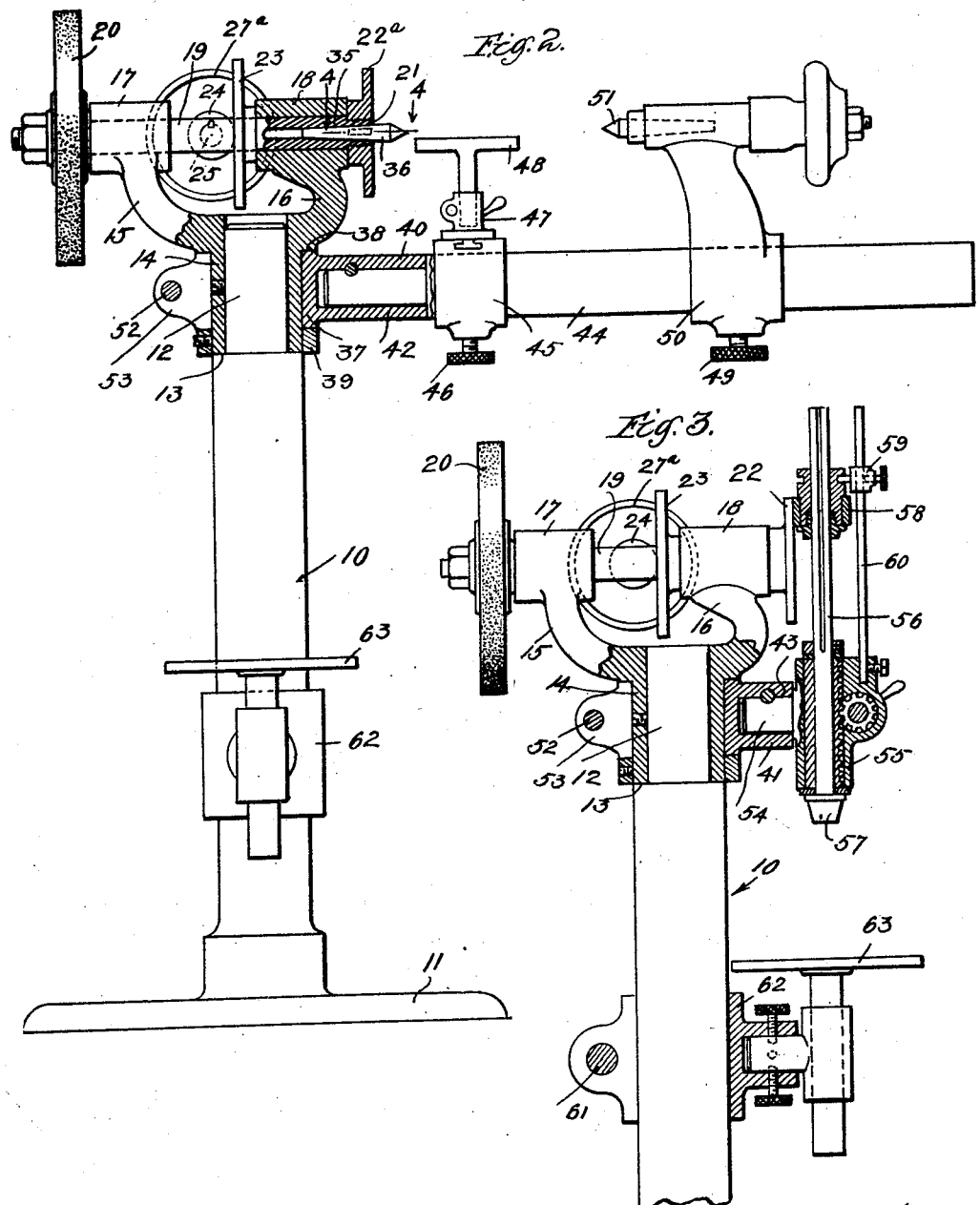

Patented June 23, 1925.

1,543,114

UNITED STATES PATENT OFFICE.

CHARLES E. H. LLOYD, OF LOS ANGELES, CALIFORNIA.

MACHINE TOOL.

Application filed September 23, 1922. Serial No. 590,050.

*To all whom it may concern:*

Be it known that I, CHARLES E. H. LLOYD, a citizen of the United States, residing at Los Angeles, in the county of Los Angeles, State of California, have invented new and useful Improvements in Machine Tools, of which the following is a specification.

My invention relates to machine tools, and pertains more particularly to a tool adapted to form a combined lathe and drill press, mounted upon a single standard or base and so designed that either tool may be quickly and conveniently thrown into gear with a single frictional driving mechanism mounted upon the standard, thereby practicing economy in the space and belting required for the installment, as well as enabling the operator to have either tool conveniently and closely at hand in the pursuance of his work.

The invention also contemplates the mounting of a tool grinding wheel on the standard, for the convenience of the operator, which is also driven by the same main drive as the other tools.

Other objects of my invention will be more fully disclosed in the following specification, reference being had to the accompanying drawings which form a part thereof, in which:

Fig. 1 is a plan view of a tool embodying the features of my invention showing the lathe member as it would appear when in use.

Fig. 2 is a vertical sectional view through the same taken on the line 2—2 of Fig. 1, viewed in the direction indicated by the arrows.

Fig. 3 is a similar view to that of Fig. 2 showing the drill press member as it would appear when in use.

Fig. 4 is an enlarged detail section taken on the line 4—4 of Fig. 2 illustrating how the lathe face plate or frictional disk may be locked in place.

Fig. 5 is a section through the same taken on the line 5—5 of Fig. 4.

In carrying out my invention 10 represents a standard externally circular in cross section and provided with a suitable base 11 adapted to rest upon the floor and to be secured in position thereon in any desirable manner.

The top end of the standard 10 is reduced in diameter to form the spindle 12 and the shoulder 13. Secured to the spindle 12 and adapted to rest upon the shoulder 13 is the sleeve 14 which is provided with the upwardly projecting arms 15 and 16 upon which are formed the oppositely disposed bearings 17 and 18.

Journaled in the bearings 17 and 18 is a shaft 19 which projects outwardly beyond the outer face of bearing 17 and has secured thereon a grinding wheel 20. The opposite end of shaft 19 projects beyond the outer face of bearing 18 and is reduced in diameter and threaded as at 21 in order that a friction drive disk 22 or a lathe face plate 22ª may be secured thereon.

Secured to the shaft 19 and adapted to rest against the inner face of bearing 18 is a friction disk 23 adapted to be driven through the medium of a friction wheel 24 which is slidably mounted on a main drive shaft 25. The drive shaft 25 is journaled in a bearing 26 formed on a bracket 27 which is secured to the bearing members 17 and 18 as clearly shown in the drawings.

The shaft 25 is provided with a pulley 27ª adapted to be belted to the line shafting and driven in the usual manner thereby.

The friction wheel 24 is provided with a key 28, shown in dotted lines, adapted to engage in a groove 29 of shaft 25 in order that it may be caused to rotate therewith, and in order that it may be adjusted longitudinally along the shaft 25 for the purpose of varying the speed of the shaft 19, the hub is provided with a groove 30 for the reception of a yoke 31 which is secured to a sleeve 32 mounted on a bolt 33 threaded into a lug 34 extending from the bracket 27.

The shaft 19 is provided with the usual tapered bore 35 for the reception of a lathe center 36.

Mounted to swivel on the sleeve 14 is a hub 37 which rests between the shoulder 38 and a collar 39 secured to said sleeve, and extending radially therefrom are the bosses 40 and 41 provided with bores 42 and 43.

Detachably secured in the bore 42 of boss 40 is the arm 44 adapted to serve as the main support for the various lathe parts, only a few of which are shown, such for instance, as the block 45 which is slidably mounted on the arm 44 and may be adjustably secured thereon by means of the set screw 46. The block 45 may be provided with the usual tool rest slide 47 to which the tool rest 48 is secured in the usual manner.

Mounted to slide on the arm 44 and to be adjustably secured thereto by means of the set screw 49 is the block 50 on which is mounted a tail stock center 51 of any desired construction.

By the above recited construction it will be obvious that when power is applied to the pulley 27, motion will be imparted to the shaft 25 through the medium of the friction drive wheel 24 and disk 23 and consequently the tail center 36 and face plate 22ª when adjusted in position will be rotated. The arm 44 may then be swung into the desired position and locked in such position by means of the clamp bolt 52 passing through the ears 53 of the split collar 14. The lathe may then be utilized in the same manner as lathes of the ordinary construction.

Removably secured in the bore 43 of boss 41 is the stem 54 of the drill head 55 in which is journaled in the usual manner the vertically disposed shaft 56 to which is secured the drill chuck 57.

Slidably mounted on the shaft 56 and adapted to rotate the same is the friction wheel 58 which may be adjusted with respect to the drill head 55 by means of the yoke member 59 which engages with said friction wheel and is adapted to slide upon and to be locked to a rod 60 secured in the drill head.

Mounted to slide upwardly and downwardly and to swivel on the standard 10 and to be adjustably secured thereon by means of the bolt 61, is a collar 62 to which is secured the tiltable and vertically adjusted drill table 63.

From the foregoing described construction it will be obvious that when it is desired to utilize the drill press the face plate 22ª may be removed and the friction disk 22 substituted therefor. The drill head may then be swung around the standard 10 until the shaft 56 is opposite the friction disk 22. The friction wheel 58 may then be slid downwardly on shaft 56 to contact with the disk 22. By this construction it will be obvious that the drill press may be operated to perform its function and that by sliding the friction wheel 58 along the shaft 56 the speed of rotation of the drill may be varied at the will of the operator.

In order that the friction disk 22 and face plate 22ª may be firmly locked on the threaded end 21 of shaft 19 they are provided with a suitable notch 62 in their bores, into which is inserted the plug 63 which is threaded to form a continuation of the thread in the bore. The hubs of these members are provided with a set screw 64 adapted to engage with the plug 62. By this construction it will be obvious that these members may be threaded on the shaft and by setting the screw 64 to the plug 62 the rotating members will be firmly clamped together.

What I claim is:

1. A machine tool, comprising a standard, a shaft mounted on said standard, means for frictionally driving said shaft, a friction disk adapted to be detachably secured to said shaft, and a plurality of radially disposed arms pivotally mounted on said standard adapted to support tool units, whereby any one of said tool units may be swung into or out of operative engagement with said friction disk.

2. A machine tool, having in combination a standard, a shaft journaled on said standard having a frictional disk detachably secured thereto, a radially disposed arm pivotally secured to said standard, a drill press spindle journaled on said arm, and a friction wheel slidably mounted on said spindle adapted to engage with the friction disk upon a swinging movement of said arm.

In witness that I claim the foregoing I have hereunto subscribed my name this 11th day of September, 1922.

CHARLES E. H. LLOYD.